United States Patent [19]
Barlow

[11] Patent Number: 5,882,105
[45] Date of Patent: Mar. 16, 1999

[54] VISUAL DISPLAY LIGHTING SYSTEM HAVING FRONT AND REAR ACCESS

[75] Inventor: James Edwin Barlow, Las Vegas, Nev.

[73] Assignee: Mikohn Gaming Corporation, Las Vegas, Nev.

[21] Appl. No.: 699,151

[22] Filed: Aug. 16, 1996

Related U.S. Application Data

[63] Continuation-in-part of Ser. No. 666,752, Jun. 19, 1996.

[51] Int. Cl.$^6$ .................................................. H01R 33/00
[52] U.S. Cl. .......................... 362/226; 362/240; 362/241; 362/249
[58] Field of Search .................................... 362/226, 240, 362/241, 249

[56] References Cited

U.S. PATENT DOCUMENTS

| | | | |
|---|---|---|---|
| 1,955,597 | 4/1934 | Lamblin-Parent | 240/41.3 |
| 2,282,587 | 5/1942 | Kurth | 240/78 |
| 3,310,672 | 3/1967 | Bursell | 240/78 |
| 3,639,751 | 2/1972 | Pichel | 240/47 |
| 4,504,894 | 3/1985 | Reibling | 362/296 |
| 4,843,527 | 6/1989 | Britt | 362/231 |
| 5,198,803 | 3/1993 | Shie et al. | 340/782 |
| 5,268,828 | 12/1993 | Miura | 362/249 |
| 5,321,417 | 6/1994 | Voeizke et al. | 362/240 |
| 5,400,228 | 3/1995 | Kao | 362/231 |
| 5,410,328 | 4/1995 | Yoksza et al. | 345/82 |

*Primary Examiner*—Carroll B. Dority
*Attorney, Agent, or Firm*—Dorr, Carson, Sloan & Birney, P.C.

[57] ABSTRACT

A visual display lighting system of a series of individual lighting modules. Each of the lighting modules having a printed circuit board containing drive circuitry and a plurality of light sources. Each module having a lighting panel which includes a reflector unit for each light source and a covering lens. A pair of retainer strips lock to the opposing ends of the lighting panel to hold the module in the display lighting system. The retainer strips quickly release from the opposing ends when the module is removed from the front of the visual display lighting system. In each module, the lighting panel has retainer clips for locking to the printed circuit board. When locked in place the board holds the plurality of light sources into the lighting panel for illumination of the sign. The printed circuit board can be quickly released from the lighting panel so that the board with the light sources can be removed from the rear of the visual display lighting system. In this event, the lighting panel continues to be locked to the pair of retaining strips.

17 Claims, 6 Drawing Sheets

Fig. 7
Fig. 8
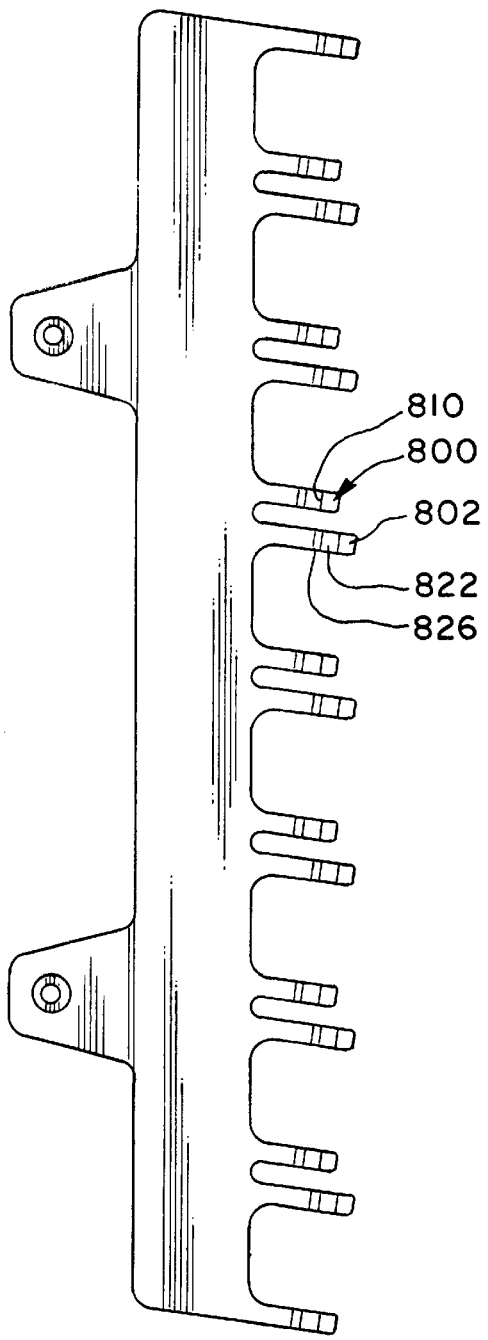
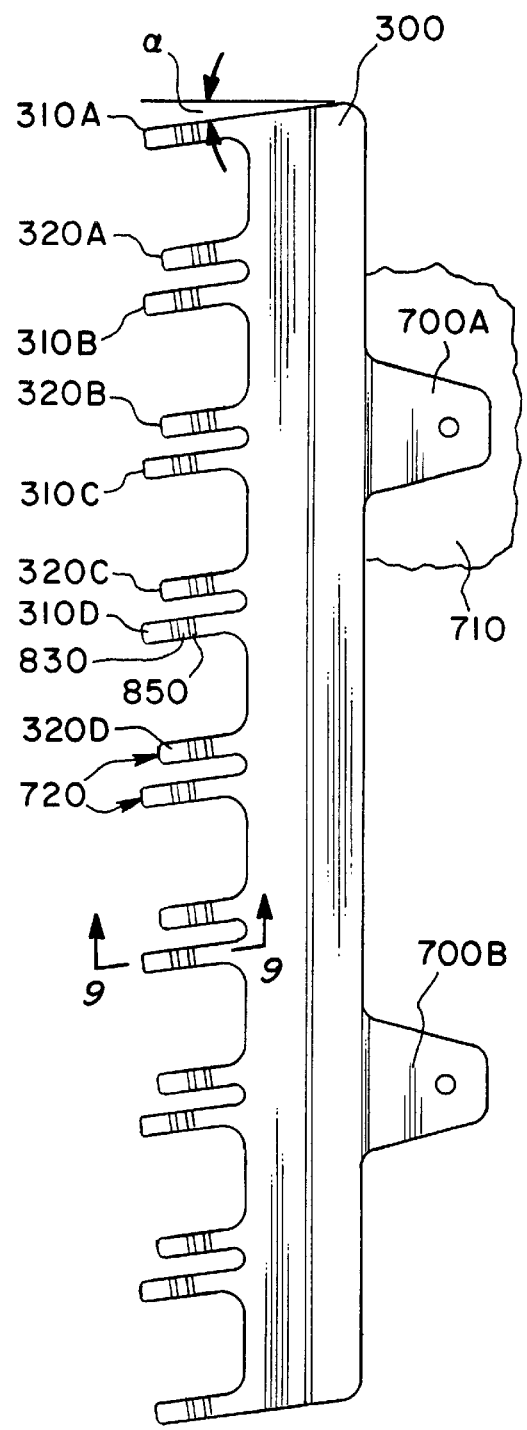

VISUAL DISPLAY LIGHTING SYSTEM HAVING FRONT AND REAR ACCESS

RELATED INVENTION

This application is a continuation-in-part of copending application Serial No. 08/666,752 filed Jun. 19, 1996 entitled "INCANDESCENT VISUAL DISPLAY SYSTEM" and this application claims the benefit thereof under 35 U.S.C. §120.

BACKGROUND OF THE INVENTION

1. Field of the Invention

The present invention relates, in general to visual display lighting systems and, more particularly, to a visual display sign using modules of incandescent bulbs wherein the modules can be removed from the front and from the rear of the sign for repair or replacement.

2. Statement of the Problem

Large visual display signs capable of showing moving images that can be located outdoors at remote locations such as on a building or on a free standing pylon or located indoors in large buildings such as arenas or casinos are conventionally available. All such signs must be periodically repaired and maintained. Those using incandescent bulbs as light sources usually require repair or replacement of the bulbs or banks of bulbs.

The following patent applications by the inventor are related to the present invention and are commonly owned by the assignee: INCANDESCENT VISUAL DISPLAY SYSTEM, Ser. No. 08/666,752 and LARGE INCANDESCENT LIVE IMAGE DISPLAY SYSTEM, Ser. No. 08/516,882.

A need exists to quickly remove modules of the display sign from either the front or the back of the sign for repair or replacement. Each module contains a number of incandescent bulbs and the electronic drive circuitry associated therewith.

A need also exists to build a universal sign that can mounted to a variety of structures without regard to whether the modules in the sign are to be serviced from the front or from the rear of the sign as mounted to the structure.

3. Solution to the Problem

Under the teachings of the present invention, a visual display sign is disclosed solving the above needs by providing lighting modules that can be removed either from the front or from the rear of the display sign. The light sources in the lighting modules are quick released from the front or quick released from the rear of the sign so as not to limit how the sign is mounted to a support structure.

SUMMARY OF THE INVENTION

A visual display lighting system is disclosed comprised of a series of individual lighting modules. Each of the modules has a board such as a printed circuit board containing drive circuitry and a plurality of light sources. Each module also includes a lighting panel which typically includes a reflector unit for each light source and a covering lens. The visual display lighting system of the present invention has an overall support to which is mounted to pairs of retainer strips. The pair of retainer strips lock to the opposing ends of the lighting panel to hold the module in the display lighting system. The retainer strips quickly release from the opposing ends when the module is removed from the front of the visual display lighting system. In each module, the lighting panel also has retainer clips for locking to the printed circuit board. When locked in place the board holds the plurality of light sources into the lighting panel for illumination of the sign. However, the printed circuit board can be quickly released from the lighting panel so that the board with the light sources can be removed from the rear of the visual display lighting system. In this event, the lighting panel continues to be locked to the pair of retaining strips on the support.

BRIEF DESCRIPTION OF THE DRAWING

FIG. 7 is a side planar view of the retainer strip of the present invention.

FIG. 8 is a side planar view of the retainer strip opposite to that of FIG. 7.

DETAILED DESCRIPTION OF THE INVENTION

1. Overview

Figure 1:
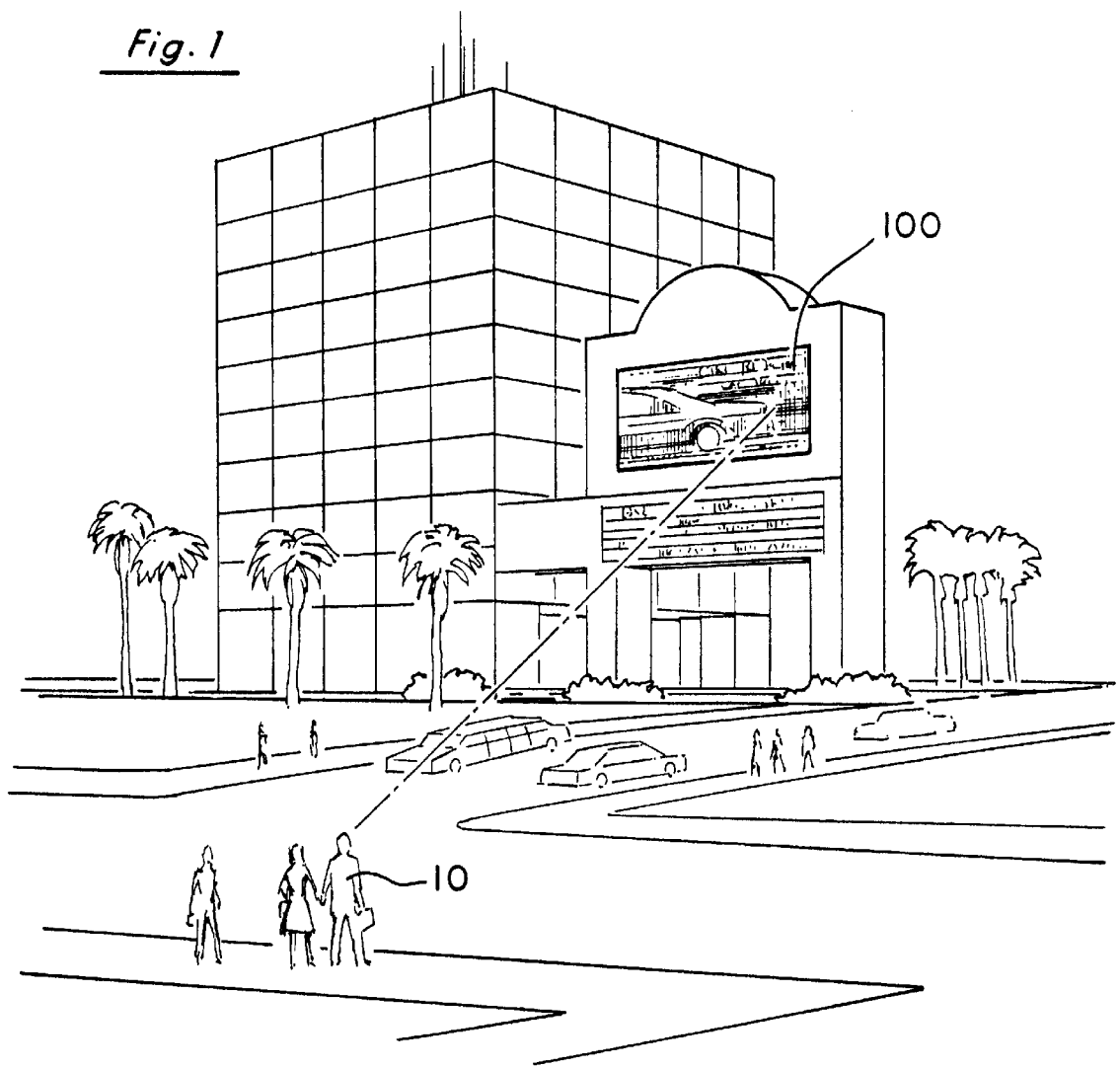
FIG. 1 illustrates the placement of the visual display lighting system on a casino.

Turning to FIG. 1, a visual display lighting system 100 in accordance with the present invention is shown. Although the display sign 100 in FIG. 1 is shown as being in a preferred outdoor location, it is to be understood that the display sign 100 is not limited to outdoor placement and that it may also be situated within a structure, and that the surrounding elements and support structure may vary from those shown in FIG. 1. For example, the display sign 100 can be placed flat against the exterior wall of a building or the interior wall of a room, or hang freely from the ceiling within a room, or stand atop the roof of a building. The display sign 100 is preferably situated to be easily visible to the viewers 10 who may be of some distance from and below the display sign 100.

The location of the display sign 100 should not be dependent upon whether the sign can be serviced from the front or the from the rear. Hence, the present invention permitting front or rear servicing does not limit the location of the sign.

Figure 2:
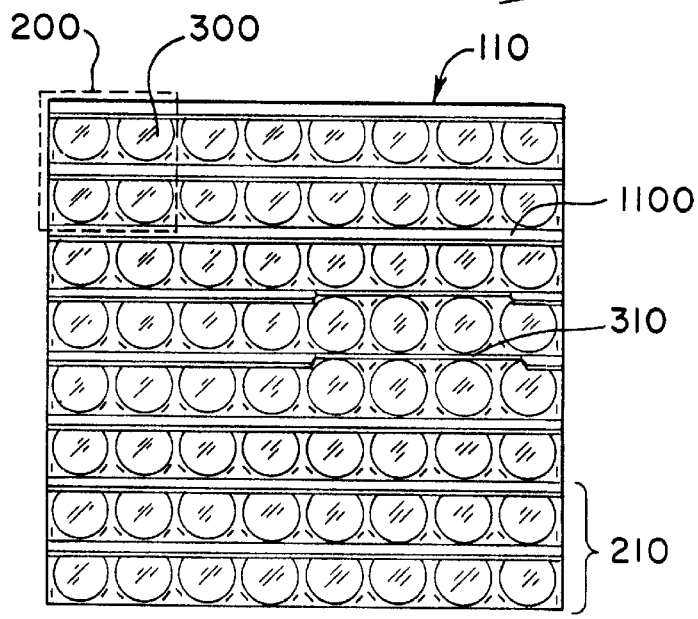
FIG. 2 illustrates a portion of the system of FIG. 1 showing four modules of the present invention.

FIG. 2 illustrates four modules 110 of the preferred embodiment of the visual display sign 100. Each module 210 preferably comprises four pixels 200 and each pixel 200 is turn comprises four individual lighting units 300 arranged in a square two across and two deep, for a total of 64 lighting units 300 in the four modules 110. Each lighting unit 300 in a first embodiment has dimensions of approximately 2 inches by 2 inches and in a second embodiment dimensions of 1 inch by 1 inch. The size of each lighting unit is immaterial under the teachings of the present invention. Hence, each pixel 200 in the first embodiment is approximately 4 inches by 4 inches and each module 110 in the first embodiment has dimensions of approximately 16 inches by 16 inches, wherein each pixel 200 in the second embodiment has dimensions of approximately 2 inches by 2 inches, and each module 110 in the second embodiment has dimensions of approximately 8 inches by 8 inches. The modules 110 can be interconnected to form a visual display sign 100 of any desired size.

In FIG. 2, a releasable module 210 is shown comprising a portion of a row in sign 100 having four pixels 200. The entire module 210 can be removed from the front or from the rear of the sign including all incandescent bulbs and the associated drive circuitry as more fully explained in the following.

Figure 3:
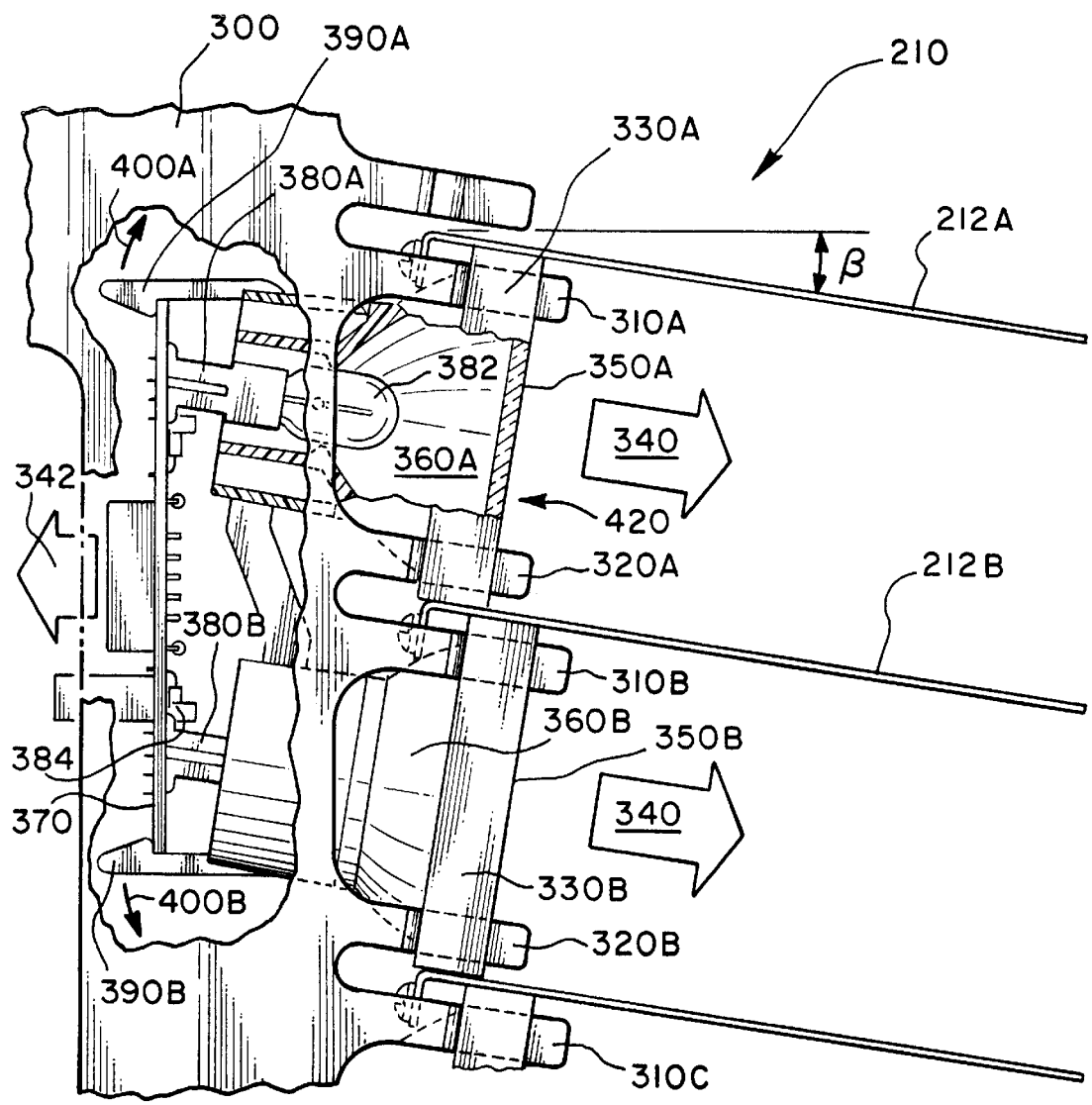
FIG. 3 shows a partial side view of a module of the present invention quick-releasing to the rear or to the front.

In FIG. 3, a module 210 is shown. The module 210 is mounted from the front to a pair of retainer strips 300. There are two retainer strips 300 one at each opposing end of the module 210. The retainer strips 300 are connected to a support 700 (See FIG. 8). The retainer strip 300 has outwardly extending pairs of prongs 310 and 320 which engage the outer edges 330 A & B of the module 210. The prongs 310, 320 are labeled 310A, 320A, 310B, 320B, etc. The prongs 310 (A and B) and 320 (A and B) are designed to lock and release from the edges 330A and 330B of the module 210 so that the module 210 can be quick released in the direction of arrow 340. The entire module 210 is removed from the retainer strips 300.

The module 210 includes a bezel 350 to which is mounted a light panel 360. Mounted to the light panel 420 is a printed circuit board 370. The printed circuit board carries the incandescent bulbs 382 in bases 380 (A and B) and the electronic drive circuitry 384. Mounted to the light panel 420 are three retainer chips 390. The printed circuit board 370 is releasably mounted to the retainer clips 390 so that the board can be quick released in the direction of arrow 342 to the rear of the sign. When the printed circuit board 370 is released from the module 210, the light panels 420 with the shades 212 (A and B) stay in place mounted to the retainer strip 300.

In accessing the front of the present invention, the entire module 210 is removed from prongs 310 and 320 and the module is moved in the direction 340. Hence the entire module 210 can be serviced. When accessed from the rear, the retaining clips 390 are released from the printed circuit board 370 and the printed circuit board 370 with the light bulbs 382 and associated electronic drive circuitry 384 are removed for servicing. It is to be expressly understood that the configuration of the printed circuit board, the type of light sources and the design of the electronic drive circuitry is immaterial to the teachings of the present invention and could be of any suitable type including those disclosed in the related applications above.

As shown in FIG. 3, the module 210 has two rows of reflectors 360A and 360B with two rows of lenses 350A and 350B. Each row is integrally connected to form module 210 and each row is set at an angle β (such as 8°) as more fully discussed in the above related applications. However, the provision of angle β, the design of the reflector 360, the design of the lens 350 or the provision of shade 212 is immaterial to the teachings of the present invention.

2. Details of Rear Quick Release

Figure 4:
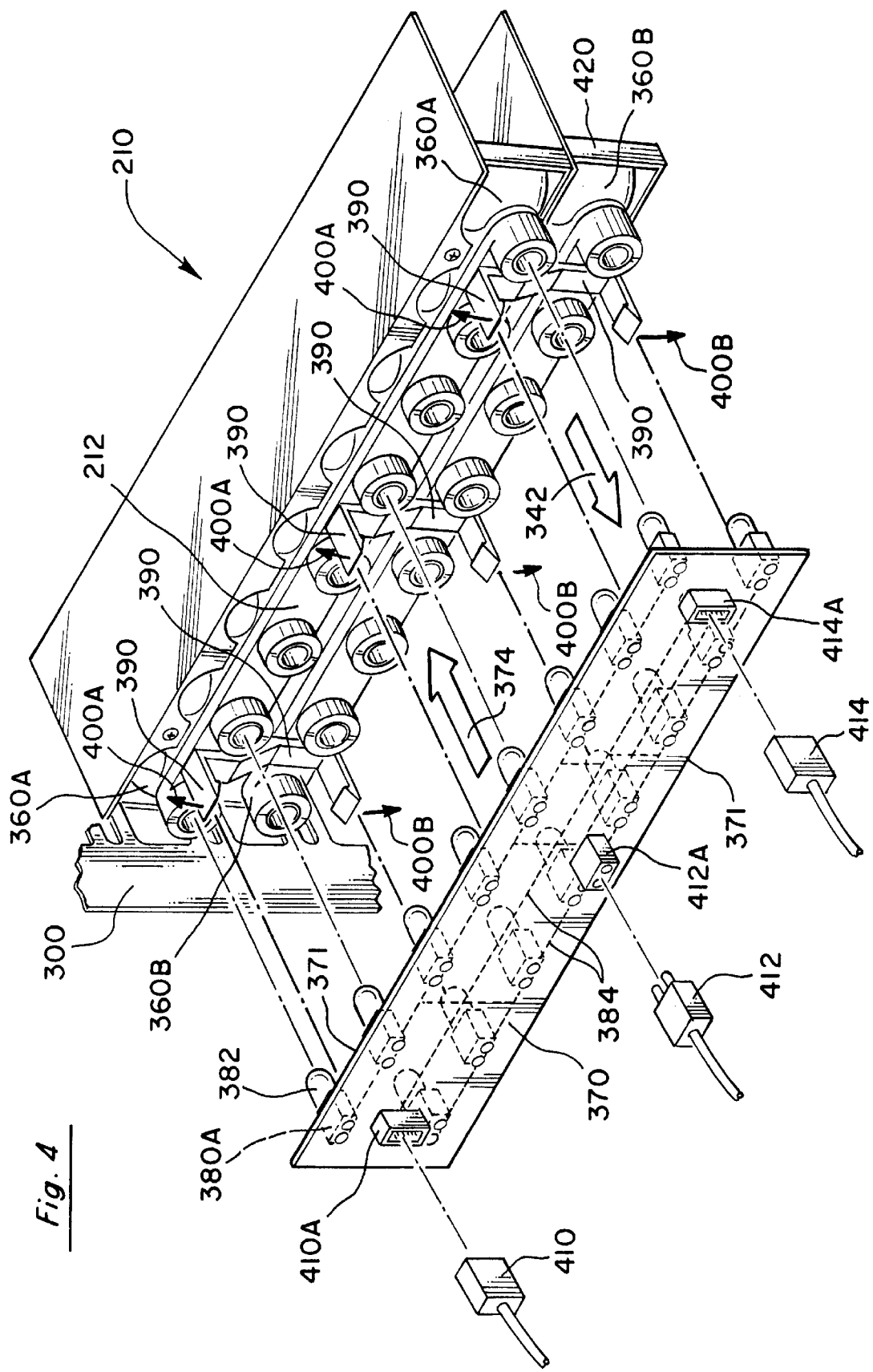
FIG. 4 is an exploded view of a module of the present invention.

In FIG. 4, the details of the structure necessary to effectuate the rear quick release in the direction of arrow 342 from the module 210 as shown. The module 210 has a plurality of light sources which in the preferred embodiment are incandescent bulbs 382, but could be any conventionally available light or equivalent light source. The module 210 also includes a board 370 for holding the light source 382. In the preferred embodiment the board 370 could be a printed circuit board which also carries electronic driver circuitry 384 for powering the light bulbs 382. On the back side 212 of the lighting panel 420 of the module 210 are mounted three retainer clips 390. Each retainer clip 390 has an upper clip 390A and a lower clip 390B. To release the printed circuit board 370 from the retainer clips 390, the ends of the clips are moved in the direction of arrows 400 and the printed circuit board 370 with the drive circuitry 384 is moved in the direction of arrow 342 thereby causing the printed circuit board 370, the bases 380 and the light bulbs 382 to be removed from the lighting panel 420. Although the preferred embodiment uses three retainer clips 390, it is to be understood that one or more clips could be utilized under the teachings of the present invention.

The printed circuit board 370 as shown in FIG. 4 may also be interconnected to various plugs carrying power and control signals such as plugs 410, 412, and 414 which engage corresponding sockets 410A, 412A and 414A.

Figure 5:
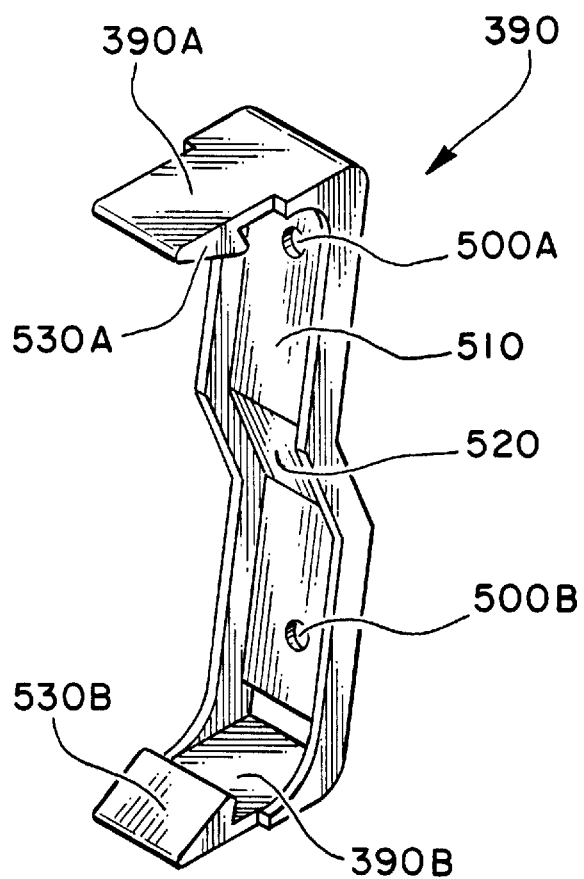
FIG. 5 is a perspective view of a retainer clip.

In FIG. 5, a retainer clip 390 is shown having ends 390A and 390B. Each retainer clip 390 has two mounting holes 500 A and 500 B on a rear base 510. The rear base 510 undergoes angular displacement 520 between ends 390A and 390B so as to compensate for the offset between the rows of individual reflectors 360A and 360B. The base 510 is connected to the upper end 390A and to the lower end 390B. Each of the the upper and lower clips 390 A and B terminate in a snap latch 530. This is further detailed in FIG. 6 where the snap latch 530 is shown in engagement with the outer peripheral end 371 of the printed circuit board 370. The tip 532 of the snap latch 530 firmly abuts against end 371 of printed circuit board 370. A wedge shaped region 532 is formed between latch 530 and printed circuit board 370 for firm engagement with the printed circuit board 370. By applying pressure in the direction of arrow 540 with a finger or tool (not shown), the latch 530 moves in the direction of arrow 400 thereby releasing from the peripheral end 371 of the printed circuit board 370. Hence, a maintenance repair person can easily release the printed circuit board 370 from the module 210 by selectively pushing in the direction of arrow 540 on each retainer clip 390.

Figure 6:
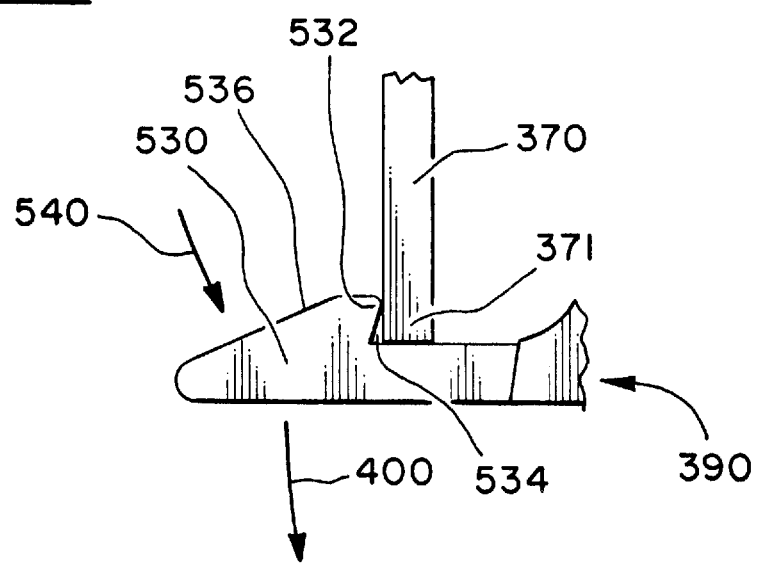
FIG. 6 is an enlarged side view of the latch of the retainer clip of FIG. 5.

To reinstall the printed circuit board 370, the maintenance repair person simply pushes the printed circuit board 370 in the direction of arrow 374 (FIG. 4) so that the printed circuit board 370 engages the inclined surface 536. The inclined surfaces 536 on all three of the retainer clips 390 cause the printed circuit board 370 to firmly and accurately seat into the module 210. Each bulb 382 being inserted into its corresponding reflector housing 360. This occurs because the edge 371 moves the snap in direction 400, a direction substantially perpendicular to the snap 530 until the edge 371 travels over tip 532 at which point, the snap 530 rapidly reverses direction and snaps to lock the board 370 in place as shown in FIG. 6. In the preferred embodiment, each retainer clip 390 is made from mineral filled nylon material having a low shrinkage factor such as 0.0035 inches per inch.

In conclusion, a preferred retainer clip 390 design has been shown in FIGS. 4 to 6 and discussed which locks to the printed circuit board 370 and holds the light sources 382 on the board 370 into the lighting panel 420. The printed circuit board 370 and the lights 382 can be quickly released from the locked state and removed from the rear of the module 210 leaving the lighting panel 420 in place. A preferred design has been shown for the quick release and it is to be understood that many other equivalent structures could be used for locking and releasing the printed circuit board from the lighting panel.

3. Details of Front Quick Release

In FIGS. 7 and 8, the retainer strip 300 of the present invention is shown. The retainer strip 300 has a number of pairs of prongs 310 and 320. The pairs total eight so that four modules 210 are held by a pair of retainer strips 300 as shown in FIG. 2. The retainer strips 300 have two mounting supports 700 A and B which enable the retaining strips 300 to be conventionally mounted to a support post 710. The design of the mounting support 700 is not critical to the teachings of the present invention and any suitable mount structure for connecting a retainer strip 300 to a support post 710 could be utilized.

The pairs of prongs 310 and 320 extend downwardly at an angle α which in the preferred embodiment is 8 degrees and corresponds to angle β. The first pair or prongs is generally shown as 310 (A and B), 320 (A and B), the second pair as 310 (C and D), 320 (C and D), etc. The retainer strip 300 is preferably made from mineral filled nylon material with a shrinkage factor of about 0.0035 inches per inch. The end 720 of the each of the prongs 310 and 320 is shown in FIG. 9.

Figure 9:
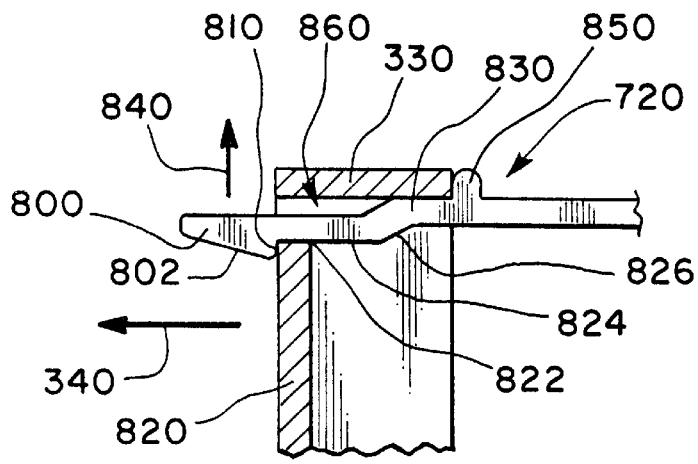
FIG. 9 is an enlarged side view of the latch of the retainer strip of FIG. 7 and 8.
Figure 10:
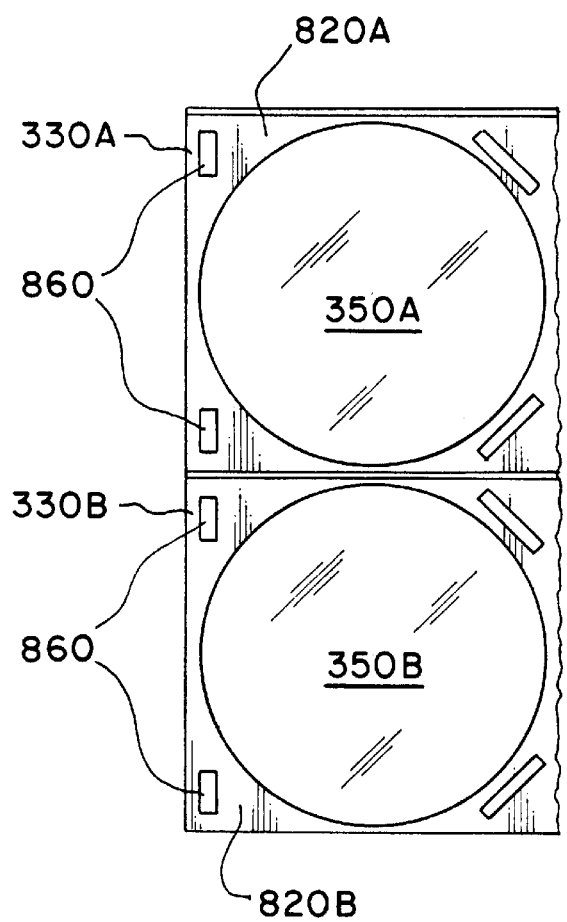
FIG. 10 is a partial planar view of the front of the lighting panel showing the engagement slots.

In FIG. 9, end 720 of clip 310 or 320 has a snap latch end 800. A hook 810 engages the inner bezel edge 820 of the module 210. The edge 352 of the module 210 engages a raised platform area 830 of ends 720. Hence, the module 210, as shown in FIG. 9, is firmly locked to the end 720 of prong 310 or 320. To release the module 210, the end 800 is moved in the direction of arrow 840 which releases the hook 810 from bezel 820. The movement 840 is permitted by provision of a slot 860.

When the snap latch 800 is moved in the direction of arrow 840, the module 210 releases and may be moved in the direction of arrow 340. Upstanding rib 850 is provided as a stop on the back edge 352 of side 350 of lighting panel 420. An inclined surface 802 is provided on end 800. When it is desired to mount the module 210 to the retainer strips 300, the end 800 is guided over the inclined ramp 802 by corner 822 of the bezel 820. This causes the end 800 to move in the direction 840 which is substantially orthogonal to the direction of end 800 and then after passing hook 810, snaps back in the opposite direction to lock against bezel 820 as shown in FIG. 9. Surface 824 abuts against bezel 820 and firm engagement occurs thereby firmly holding the module 210 in place against rib 850.

In conclusion, a preferred retainer strip design has been shown in FIGS. 7 to 10 and discussed which locks to the lighting unit of the module. The module can be quickly released from the locked state and removed from the front of the sign. A preferred design has been shown for the quick release and it is to be understood that many other equivalent structures could be used for locking and releasing the module from sign.

The invention has been described with reference to the preferred embodiment. Modifications and alterations will occur to others upon a reading and understanding of this specification. It is intended to include all such modifications and alterations insofar as they come within the scope of the appended claims or the equivalents thereof.

I claim:

1. A visual display lighting system comprising:
   a support, at least one module, said at least one module having:
   (a) a plurality of light sources,
   (b) a board holding said plurality of light sources,
   (c) a lighting panel, said lighting panel having opposing ends,
   first means connected to said support for locking to said opposing ends of said lighting panel for holding said module in said visual display lighting system, said locking means releasing from said lighting panel when said module is removed from the front of said visual display lighting system,
   said lighting panel having second means for locking to said board in order to hold said plurality of light sources in said lighting panel, said second locking means releasing from said board in order to remove said board holding said light sources from the rear of said visual display lighting system thereby leaving said lighting panel locked to said support by said first locking means.

2. A visual display lighting system comprising:
   a support, at least one module, said at least one module having:
   (a) a plurality of light sources,
   (b) a board holding said plurality of light sources,
   (c) a lighting panel, said lighting panel having opposing ends,
   a pair of retainer strips connected to said support for locking to said opposing ends of said lighting panel for holding said module in said visual display lighting system, said retainer strips releasing from said opposing ends of said lighting panel when said module is removed from the front of said visual display lighting system,
   said lighting panel having at least one retainer clip locking to said board for holding said plurality of light sources in said lighting panel, said at least one retainer clip releasing from said board in order to remove said board holding said light sources from the rear of said visual display lighting system thereby leaving said lighting panel locked to said pair of retainer strips.

3. The visual display lighting system of claim 2 wherein each of said light sources is an incandescent bulb.

4. The visual display lighting system of claim 2 wherein said board is a printed circuit board, said printed circuit board having electronic drive circuitry for controlling the delivery of power to said plurality of light sources.

5. The visual display lighting system of claim 2 wherein said lighting panel has a reflector and lens for each of said plurality of light sources.

6. The visual display lighting system of claim 2 wherein each retainer strip of said pair has at least one outwardly extending prong selectively engaging said opposing ends.

7. The visual display lighting system of claim 2 wherein said at least one retainer clip locks to the outer periphery of said board.

8. A visual display lighting system comprising:
   a support, at least one module, said at least one module having:
   (a) a plurality of bulbs,
   (b) drive circuitry for powering said plurality of bulbs,
   (c) a printed circuit board holding said plurality of bulbs and said drive circuitry,
   (d) a lighting panel, sail lighting panel having opposing ends,
   a pair of retainer strips connected to said support for locking to said opposing ends of said lighting panel for holding said module in said visual display lighting system, said retainer strips releasing from said opposing ends when said module is removed from the front of said visual display lighting system, said lighting panel having at least one retainer clip locking to said printed circuit board for holding said plurality of bulbs in said lighting panel, said at least one retainer clip releasing from said printed circuit board in order to remove said printed circuit board from the rear of said visual display lighting system.

9. The visual display system of claim 8 wherein said plurality of bulbs are light bulbs.

10. The visual display system of claim 8 wherein said module contains four pixels and wherein each of said four pixels has four bulbs.

11. The visual display system of claim 8 wherein each retainer strip of said pair has at least one outwardly extending prong selectively engaging said opposing ends.

12. The visual display system of claim 8 wherein said at least one retainer clip locks to the outer periphery of said printed circuit board.

13. A visual display lighting system comprising:
   a support, at least one module, said at least one module having:
   (a) a plurality of incandescent bulbs,
   (b) drive circuitry for powering said plurality of incandescent bulbs,
   (c) a printed circuit board holding said plurality of incandescent bulbs and said drive circuitry,
   (d) a lighting panel, said lighting panel having opposing ends, each of said opposing ends having formed slots
   a pair of retainer strips connected to said support, each of said pair of retainer strips having outwardly extending prongs for locking into said formed slots so as to hold said module in said visual display lighting system, said outwardly extending prongs releasing from said formed slots when said module is removed from the front of said visual display lighting system,
   said lighting panel having at least one retainer clip locking to the periphery of said printed circuit board for holding said plurality of incandescent bulbs in said lighting panel, said at least one retainer clip releasing from the periphery of said printed circuit board in order to remove said printed circuit board from the rear of said visual display lighting system.

14. The visual display lighting system of claim 2 wherein said module contains four pixels and wherein each of said four pixels has four bulbs.

15. The visual display lighting system of claim 13 wherein each said outwardly extending prong has an end having an inclined ramp terminating in a hook, said ramp engaging said formed slot in said lighting panel for causing said outwardly extending prong to in a direction substantially perpendicular to the slot until said hook is encountered whereupon said outwardly extending prong snaps back towards said slot.

16. The visual display lighting system of claim 15 wherein each said outwardly extending prong further has a formed rib across said prong, said formed rib abutting against a portion of said lighting panel for firmly holding said lighting panel to said retainer strip when said prong snaps back.

17. The visual display lighting system of claim 15 wherein said at least one retainer clip has a pair of opposing clips for engaging opposing peripheral edges of said printed circuit board.

* * * * *

UNITED STATES PATENT AND TRADEMARK OFFICE
CERTIFICATE OF CORRECTION

PATENT NO. : 5,882,105
DATED : March 16, 1999
INVENTOR(S) : James E. Barlow

It is certified that error appears in the above-indentified patent and that said Letters Patent is hereby corrected as shown below:

Title page, item
[56] References Cited, replace "Voeizke" with --Voelzke--

Col. 1, line 41, before "mounted" insert --be--

Col. 1, line 62, replace "mounted to" with --mounted two--

Col. 2, line 60, replace "is turn" with --in turn--

Col. 3, line 29, replace "360" with --420--

Col. 3, line 33, replace "chips 390" with --clips 390--

Col. 5, line 43, replace "direction 840" with --direction 340--

Col. 5, line 6 , replace "from sign" with --from the sign--

Col. 6, claim 8, line 60, replace "sail" with --said--

Col. 8, claim 15, line 18, after "prong to" insert --move--

Signed and Sealed this

Eighth Day of February, 2000

*Attest:*

*Attesting Officer*

Q. TODD DICKINSON

*Commissioner of Patents and Trademarks*

UNITED STATES PATENT AND TRADEMARK OFFICE
CERTIFICATE OF CORRECTION

PATENT NO. : 5,882,105
DATED : March 16, 1999
INVENTOR(S) : James E. Barlow

It is certified that error appears in the above-indentified patent and that said Letters Patent is hereby corrected as shown below:

Title page, item
[56] References Cited, replace "Voeizke" with --Voelzke--

Col. 1, line 41, before "mounted" insert --be--

Col. 1, line 62, replace "mounted to" with --mounted two--

Col. 2, line 60, replace "is turn" with --in turn--

Col. 3, line 29, replace "360" with --420--

Col. 3, line 33, replace "chips 390" with --clips 390--

Col. 5, line 43, replace "direction 840" with --direction 340--

Col. 5, line 56, replace "from sign" with --from the sign--

Col. 6, claim 8, line 60, replace "sail" with --said--

UNITED STATES PATENT AND TRADEMARK OFFICE
CERTIFICATE OF CORRECTION

PATENT NO. : 5,882,105
DATED : March 16, 1999
INVENTOR(S) : James E. Barlow

It is certified that error appears in the above-identified patent and that said Letters Patent is hereby corrected as shown below:

Col. 8, claim 15, line 18, after "prong to" insert --move--

This certificate supersedes Certificate of Correction issued February 8, 2000.

Signed and Sealed this

Second Day of May, 2000

Attest:

Q. TODD DICKINSON

*Attesting Officer*    *Director of Patents and Trademarks*